United States Patent [19]

Björshol

[11] Patent Number: 4,567,684
[45] Date of Patent: Feb. 4, 1986

[54] APPARATUS FOR HOOKING AND POSSIBLY BAITING OF A FISHING LINE

[76] Inventor: Kolbjörn Björshol, N-6560 Langöyneset, Norway

[21] Appl. No.: 486,953

[22] PCT Filed: Jul. 29, 1982

[86] PCT No.: PCT/NO82/00042

§ 371 Date: Mar. 16, 1983

§ 102(e) Date: Mar. 16, 1983

[87] PCT Pub. No.: WO83/00416

PCT Pub. Date: Feb. 17, 1983

[30] Foreign Application Priority Data

Aug. 5, 1981 [NO] Norway .................. 812658

[51] Int. Cl.[4] ............................................. A01K 79/00
[52] U.S. Cl. ............................................. 43/4; 43/57.3; 43/4.5; 43/27.4
[58] Field of Search ............ 43/4, 4.5, 27.4, 57.2, 43/57.3; 29/9

[56] References Cited

U.S. PATENT DOCUMENTS

| | | | |
|---|---|---|---|
| 1,996,681 | 4/1935 | Marvoll | 43/4 |
| 2,511,828 | 6/1950 | Andrist | 43/4 |
| 3,377,733 | 4/1968 | Godo | 43/4 |
| 3,841,011 | 10/1974 | Tison | 43/4 |
| 3,997,996 | 12/1976 | Nygaard | 43/4 |
| 4,068,399 | 1/1978 | Björshol . | |
| 4,250,648 | 2/1981 | Jacobsen | 43/4 |
| 4,277,905 | 7/1981 | Huse | 43/4 |
| 4,354,323 | 10/1982 | Huff | 43/4 |
| 4,407,087 | 10/1983 | Huse | 43/4 |
| 4,437,254 | 3/1984 | Fancey et al. | 43/4 |

FOREIGN PATENT DOCUMENTS 139843 2/1979 Norway .
143045 9/1980 Norway .

Primary Examiner—Nicholas P. Godici
Assistant Examiner—Kurt Rowan
Attorney, Agent, or Firm—Watson, Cole, Grindle & Watson

[57] ABSTRACT

An apparatus for hooking and possibly baiting of a fishing line (1) which is provided with snoods (2) arranged in spaced relationship along the length of the line and each provided with a head (3). The apparatus is provided with a rotatable table which mounts a hook store (13), possibly a bait store (14) and a slide member (15) which, under rotation of the table performs a rectilinear radial movement for the purpose of bringing a fishing hook (17) from the hook store (13) into engagement with a snood head, possibly through a bait (18) from the bait store (14).

2 Claims, 7 Drawing Figures

APPARATUS FOR HOOKING AND POSSIBLY BAITING OF A FISHING LINE

BACKGROUND OF THE INVENTION

In long-line fishing a line is used which is provided with a great number of hooks, each connected to the line through a snood. In use, each hook is to be provided with a bait, and when the line is not in use, care must be taken that the line with its snoods are to the greatest possible extent prevented from being tangled or knotted. Consequently, it has been suggested to store the line without mounted hooks, the connection between each hook and its snood and the baiting of the individual hooks being effected during the setting of the line, the hooks being again disconnected from their snoods during the hauling in of the line.

As mentioned, the number of hooks associated with a single line is very great. Consequently, it is of the greatest importance to reduce the time and work involved in the individual hooking and baiting.

SUMMARY OF THE INVENTION

The present invention relates to an apparatus which primarily is adapted for the hooking of a fishing line which is provided with snoods situated at a distance from each other along the length of the line, each snood being provided with a head which is adapted to receive and releasably hold the neck of a fishing hook, and which may also be provided with means for the baiting of the individual fishing hooks.

The inventive the apparatus that it comprises a turnable table mounting at least one combination of devices in radial arrangement relatively to the rotation axis of the table, each such combination comprising at least one hook store, means adapted to transitorily receive a snood head, and a slide number adapted to be moved radially under the control of an eccentrical guide means, thereby moving a fishing hook leg from the hook store into a snood head possibly also baiting is effected without any necessity of manual activity. It is possible to provide the apparatus with a plurality of device combinations, so that it be possible during one complete rotation of the disc to perform a plurality of operations.

Further features of the apparatus according to the invention will appear from the following description, with reference to the accompanying drawings, which illustrate schematically how an apparatus according to the invention may be designed. It is to be noted that the drawings show the arrangement of one set of devices with four "stations" for the performance of the various operations as mentioned; however, it is obvious that the number of sets may be adjusted according to conditions, and possibly be made far more numerous, such as equal to 10 or 12. The drawings illustrate an apparatus adapted also for baiting.

DESCRIPTION OF THE DRAWINGS

In the drawings

FIG. 1a is a sectional view of the apparatus as seen along line X—X in FIG. 1.

DETAILED DESCRIPTION OF THE PREFERRED EMBODIMENT

Figure 1:
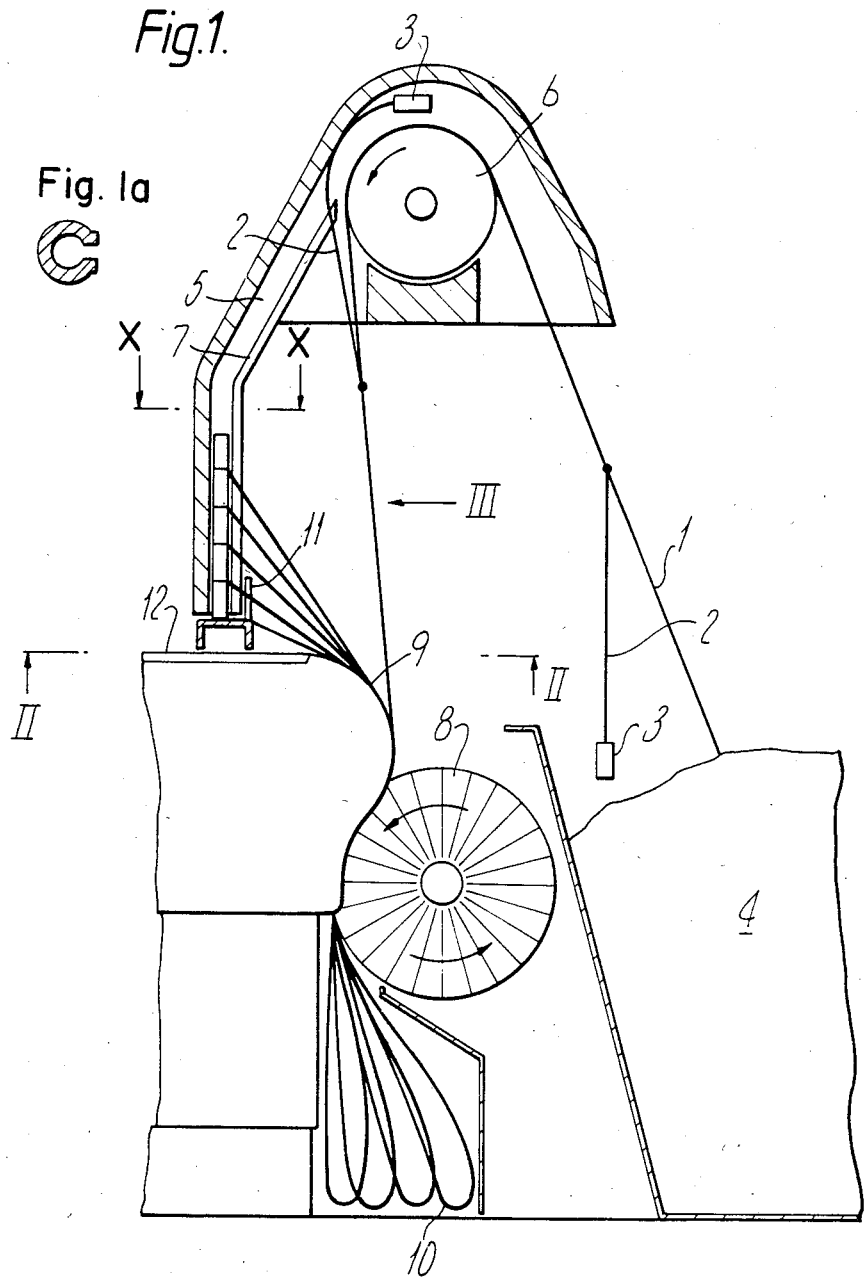
FIG. 1 is a vertical sectional view as seen at right angles to the line I—I in FIG. 2, through such part of the apparatus in which the snoods and their heads are aligned.

The apparatus illustrated in the accompanying drawings is adapted for hooking and baiting of a line 1 with snoods 2, each snood being provided with a head 3 adapted to receive the neck of a fishing hook. The line 1 with its snoods 2 and snood heads 3 is assumed to be stored in a tub 4.

The apparatus comprises a guide passage which is provided with a driven line advancing wheel 6 and is provided with a longitudinally extending slot 7, so that the snood heads are passed along the passage 5 while the snoods protrude through the slot 7. The passage 5 extends obliquely in a conical surface having its axis extending through the center of the wheel 6, so that the individual snoods which protrude through the slot 7 will be in spaced arrangement in the noted conical surface.

From the wheel 6, the line 1 runs downwardly and is caught by an advancing wheel 8, which may be a laminated brush or, preferably, a rubber wheel provided with a spring-loaded board for the purpose of enhancing the frictional engagement between the line 1 and the wheel 8. Through the pull on the line 1 by the wheel 8, the snoods which protrude through the passage slot 7 are tightened, thereby running over a curved cylindrical surface 9 in the form of loops 10.

At its lower end the passage 5 meets a member 11 which is secured to a rotatable table 12 and is adapted to fixedly hold a snood head 3 during the rotation of the table 12. Further, the table 12 carries a hook store 13 and a bait store 14, as well as a slide member 15 which is adapted to slide radially on the table 12 under the control of a circular guide 16, which is eccentrically mounted relative to the axis of the table 12. The slide member 15 is adapted to pass under the hook store 13 and, during its movement radially outwardly carry along a hook 17 from the store 13 and then pass the hook neck through the lower part of the bait in the store 14. Further a knife 19 is stationarily mounted in the apparatus, which knife cuts off a part of the bait 18 through which part the hook neck is passed.

Figure 6:
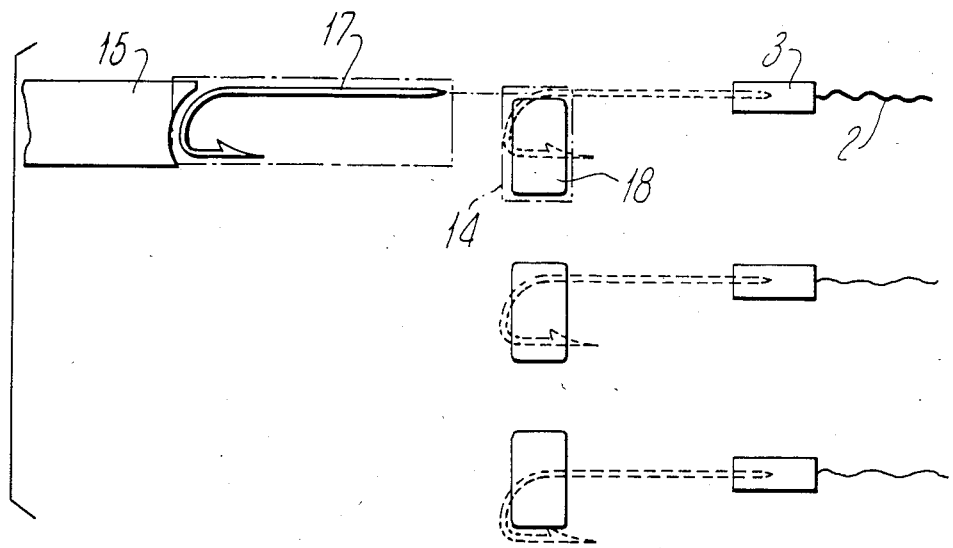
FIG. 6 is a plan view corresponding to that of FIG. 5.

The position of the bait store 14 may be so adjusted that the hook neck 17 enters the bait 18 in different positions along the circumference of the table 12, in order thereby to achieve different positionings of the bait on the hook neck see FIG. 6.

Figure 2:
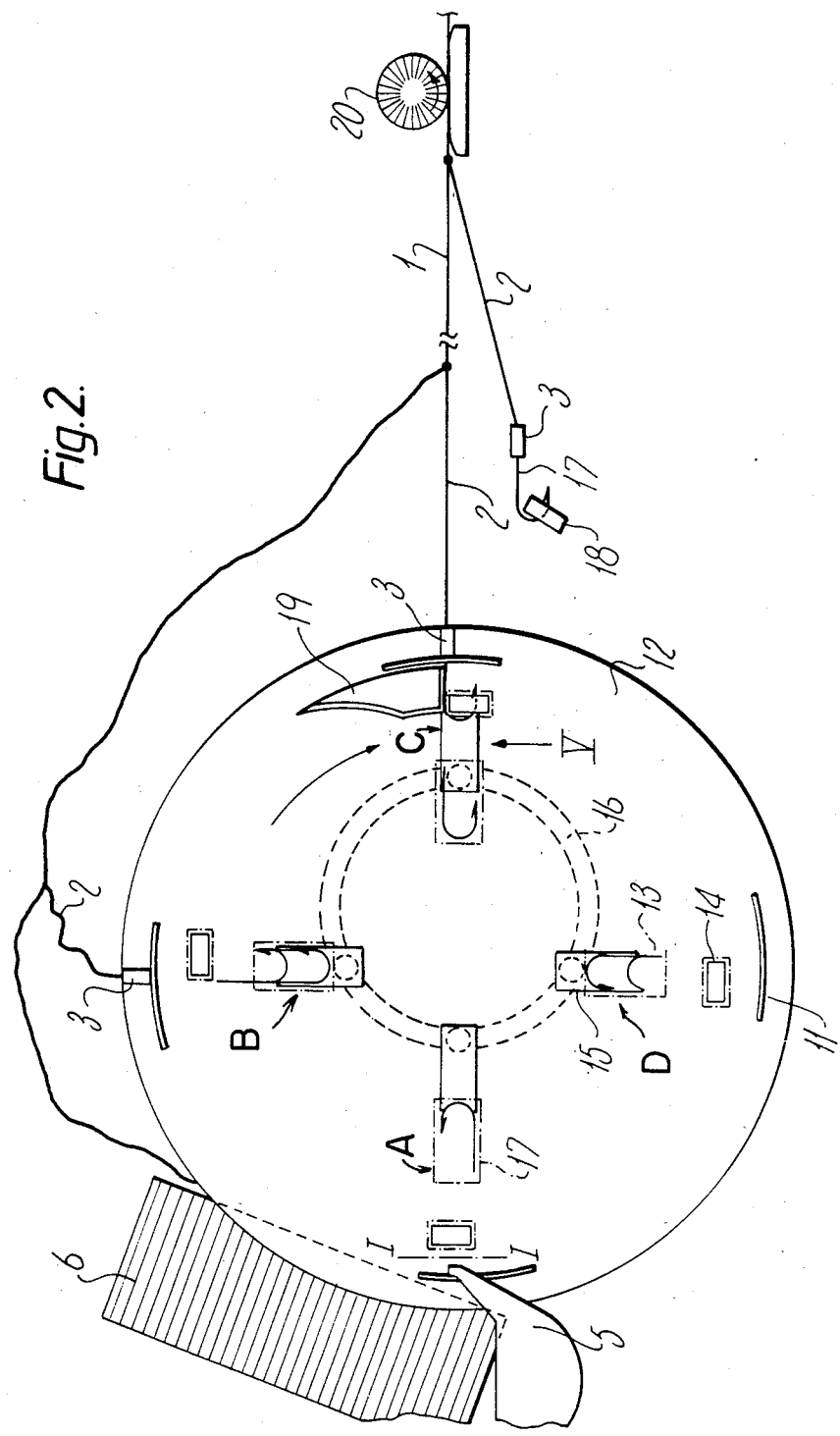
FIG. 2 shows a view of the apparatus located above line II—II in FIG. 1 as seen from above.
Figure 4:
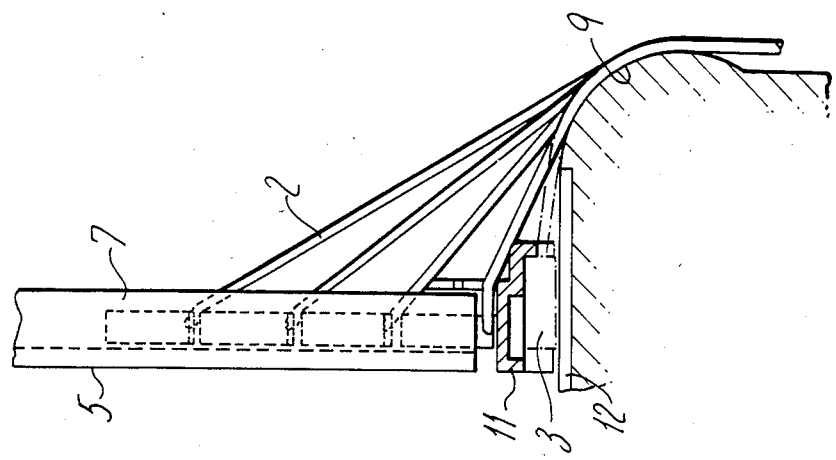
FIG. 4 is a view as seen in the direction of the arrow IV in FIG. 3.
Figure 3:
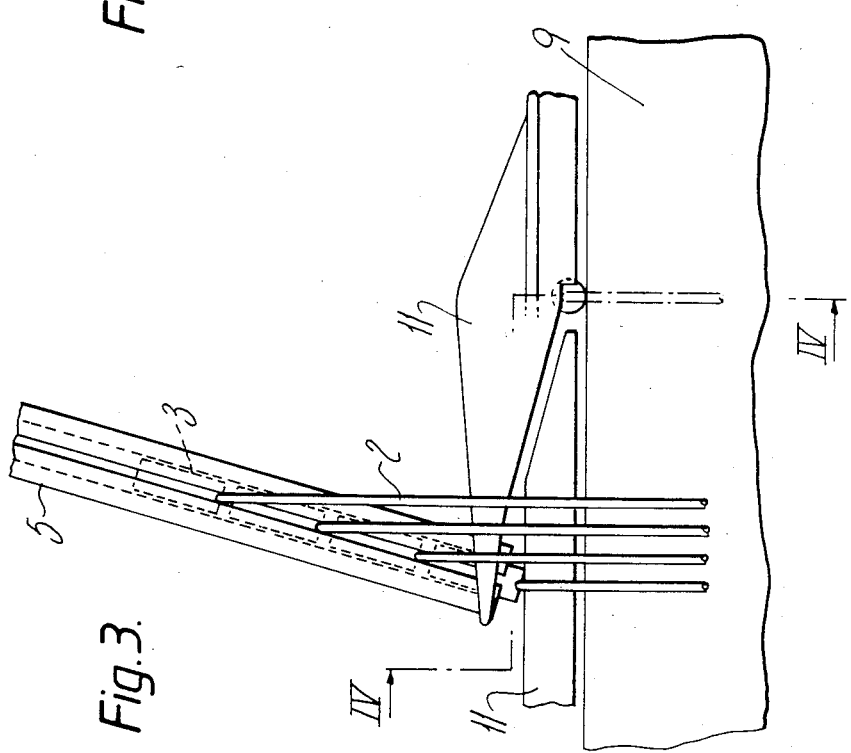
FIG. 3 is a view of part of the apparatus as seen in the direction of the arrow III in FIG. 1.
Figure 5:
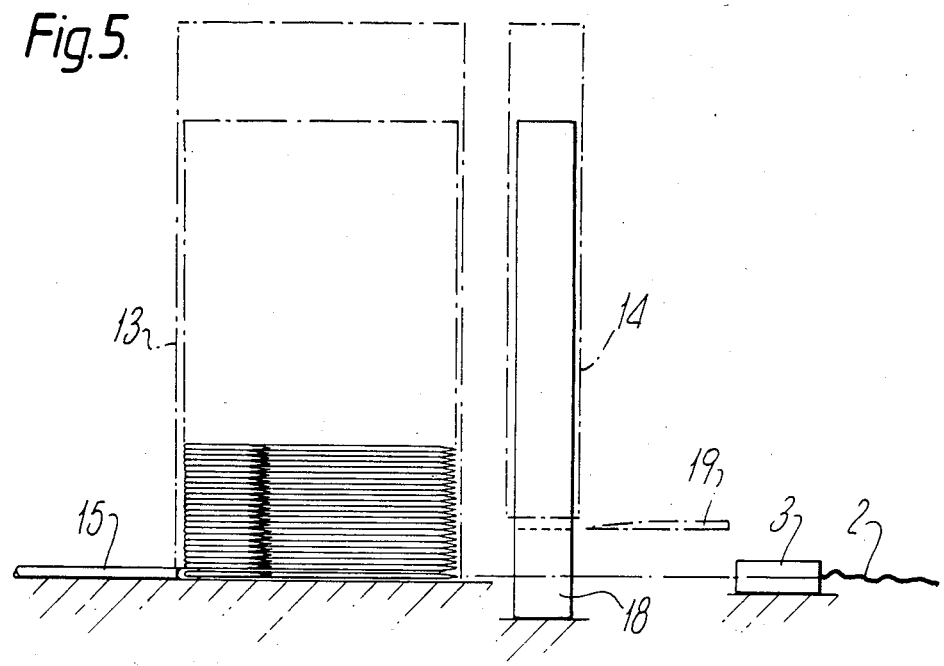
FIG. 5 is a view as seen in the direction of the arrow V in FIG. 2.

FIG. 2 shows the devices 11 to 18 in four positions A, B, C and D, with the slide member 15 in the different radial positions which it may occupy during the rotation of the table 12. In order to increase the step of the operations, more sets of devices may be mounted, each of which performs its series of operations during one revolution of the table. The distance between the individual snoods distributed along the curved wall, see FIG. 3, then corresponds to the distance between the device sets along the circumference of the table 12. When more sets of devices are used, the members 11 will follow each other more or less closely and may form a ring.

In the embodiment shown in the accompanying drawings the apparatus according to the invention operates in the following manner:

The line 1 is drawn from the bin 4 over the wheel 6 by means of the wheel 8, and the snood heads 3 are drawn downwardly into the passage 5 with the snoods 2 protruding through the slot 7. Due to the oblique position of the passage 5, see FIGS. 1 and 3, the snoods 2 protrude through the slot 7 in spaced relationship and in this position they are kept taut over the curved wall 9 by means of the wheel 8.

At the lower end of the passage 5 the snood head is caught by a catch member 11 mounted in the edge of the rotatable table 12 and in radial alignment with the hook store 13, the bait store 14 and the slide member 15. The table 12 is now in a position with the devices located in position A in FIG. 2 with the end of the slide member close to the inner end of the hook store 13. Further rotation of the table 12 will cause the slide member 15 to move radially outwardly under the control of the guide 16 to a position, in which a hook 17 is pushed outwardly until the end of the hook neck engages the bait 18 in the store 14, see position B in FIG. 2. Under further rotation of the table 12, i.e., to position C in FIG. 2, the hook neck will have passed through the bait and will have arrived at the inlet to the snood head 3. At the same time, the devices will have passed a stationary knife 19 which cuts the bait 18 at a suitable, adjustable height above the table 12. As the table rotates and moves the devices from position C to position D in FIG. 2, the slide member 15 will to move radially inwardly, to thereby liberate the outlets from the stores 13 and 14, so that all parts are again ready for action as shown in position A in FIG. 2, and the snood head 3 with the bait and mounted hook 17 are withdrawn by a pull in the line 1 by means of a pull wheel 20, as shown in of FIG. 2.

From the wheel 20 the line 1, fully hooked and baited, is passed over the ship's rail.

I claim:

1. In an apparatus for hooking a fishing line which is provided with snoods situated at a distance from each other along the length of the line, each snood being provided with a head which is adapted to receive and releasably hold the neck of a fishing hook, a turnable table mounting at least one combination of devices in radial arrangement relatively to the rotation access of the table, each such combination comprising at least one hook store, means adapted to transitorily receive a snood head, and a slide member adapted to be moved radially under the control of an eccentrical guide means, thereby moving a fishing hook leg from the hook store into a snood head.

2. An apparatus as claimed in claim 1, wherein each radial combination of devices also comprises a bait store situated adjacent to the slide member in the path of the hook when passing from the hook store to the snood head receiving means.

* * * * *